US006842718B2

(12) United States Patent
Byrd et al.

(10) Patent No.: US 6,842,718 B2
(45) Date of Patent: Jan. 11, 2005

(54) INTELLIGENT AUXILIARY COOLING SYSTEM

(75) Inventors: Douglas S. Byrd, Copley, OH (US); Thomas R. Anderson, Perry, OH (US); Francis E. Ricard, Stow, OH (US); Ken Lambach, Munroe Falls, OH (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 10/359,203

(22) Filed: Feb. 6, 2003

(65) Prior Publication Data

US 2004/0158428 A1 Aug. 12, 2004

(51) Int. Cl.[7] ............................ G06F 19/00; G05D 23/00
(52) U.S. Cl. ...................... 702/182; 702/130; 702/136; 700/299; 340/646
(58) Field of Search ................................. 700/276, 278, 700/286, 299; 702/182, 130, 132, 136; 374/141; 323/355, 371; 363/178, 141, 35, 37; 336/55, 57, 61, 58; 340/635, 643, 646

(56) References Cited

U.S. PATENT DOCUMENTS

| | | | | |
|---|---|---|---|---|
| 3,855,503 A | * | 12/1974 | Ristuccia ..................... | 361/37 |
| 4,654,806 A | * | 3/1987 | Poyser et al. ............... | 700/292 |
| 4,916,628 A | * | 4/1990 | Kugler ........................ | 700/286 |
| 5,838,881 A | | 11/1998 | Nelson et al. | |
| 6,385,510 B1 | * | 5/2002 | Hoog et al. ................. | 700/276 |
| 6,424,266 B1 | * | 7/2002 | Weekes et al. .............. | 340/588 |
| 6,446,027 B1 | * | 9/2002 | O'Keeffe et al. ........... | 702/183 |
| 6,494,617 B1 | * | 12/2002 | Stokes et al. ............... | 374/152 |
| 6,609,079 B1 | * | 8/2003 | Seitlinger ................... | 702/136 |
| 6,714,022 B2 | * | 3/2004 | Hoffman ..................... | 324/547 |

FOREIGN PATENT DOCUMENTS

WO 01/37292 A1 5/2001

OTHER PUBLICATIONS

Leibfried, "Online Monitors Keep Transformers in Service", IEEE, 1998.*
Lachman et al., "Real–Time Dynamic Loading and Thermal Diagnostic of Power Transformers",IEEE, Jan. 2003.*
Lesieutre et al., "An Improved Transformer Top Oil Temperature Model for Use in An On–Line Monitoring and Diagnsotic System", IEEE, 1996.*
Schaefer et al., "Condition Monitoring Syst m for Power Transformers", IEEE, 2000.*
Palmer et al., "Intelligent Control of Large Power Transformer Cooling Pumps", IEEE, Sep. 1996.*
Hunt et al., "Improving the Operation of Distribution Substations", IEEE, 2001.*

* cited by examiner

Primary Examiner—Patrick Assouad
(74) Attorney, Agent, or Firm—Nixon & Vanderhye PC

(57) ABSTRACT

A portable auxiliary cooling system for cooling electrical power transformers is provided with an intelligent controller that is programmable for functioning in a plurality of different operational modes. A plurality of sensors monitor cooling system equipment operation, transformer top oil temperature and transformer current. The cooling system controller includes a user-interface panel, a modem and/or other digital communications circuitry, data storage memory and a computer or microprocessor that performs real-time heat removal rate computations and automatically controls heat pump and fan operation in response to the computed results. System performance data, sensor readings and alarm condition indications are indicated on a user-interface panel and may also be provided to a remote station or operator using conventional digital communication facilities.

31 Claims, 3 Drawing Sheets

INTELLIGENT AUXILIARY COOLING SYSTEM

This invention relates generally to cooling systems for electrical power transformers and, more particularly, to an intelligent controller for a portable auxiliary cooling system used for cooling electrical power transformers.

BACKGROUND OF THE INVENTION

Power transformers utilized throughout the electrical power generation, transmission and distribution industry are equipped with a variety of cooling systems designed to remove excess heat generated during transformer operations. Although these installed cooling systems typically have adequate cooling capacity to maintain transformer winding temperatures within acceptable limits, auxiliary cooling may become necessary during periods of extreme environmental conditions and/or abnormally high power loading conditions. These auxiliary cooling systems may be employed to prevent heat-related damage to transformer windings as well as to increase the working life span of a transformer by reducing the time the transformer is operated at elevated temperatures.

Conventionally, such auxiliary cooling systems consist of a basic heat exchanger that is either turned on/off manually or automatically by a conventional thermostat mechanism. Even in those instances where the auxiliary transformer cooling system is simply left running continuously, the operator often does not know if the auxiliary cooling system is performing adequately. Consequently, it would be highly desirable to have an auxiliary transformer cooling system that would provide a reliable means of removing heat from the transformer, and alert the operator if the auxiliary cooling system fails to perform properly or the transformer heat load exceeds the heat removal capacity of the auxiliary cooling system to provide adequate cooling to the transformer windings.

BRIEF DESCRIPTION OF THE INVENTION

The present invention provides an auxiliary "add-on" cooling system for electrical power transformers. Basically, the auxiliary cooling system of the present invention comprises a programmable "intelligent" controller and a portable compact heat exchanger unit that operate together as a stand-alone heat removal system which may be used, for example, as an auxiliary "add-on" cooling system for electrical power transformers. The intelligent controller of the present invention includes a programmable computer or micro-controller that turns on the auxiliary cooling system at an operator-selected top oil temperature and/or a set of anticipatory conditions (such as a combination of top oil temperature, ambient temperature, time-of-day, and/or transformer phase current). During auxiliary cooler operation, the micro-controller performs real-time heat removal rate computations, while the system provides local and remote indication of cooler heat removal rates and alerts the operator if the auxiliary cooler is failing to achieve the predicted heat removal rate for the ambient conditions. This feature enables detection of cooling malfunctions—such as fouling of heat transfer surfaces—which are not detectable by other means. A plurality of sensors are used for monitoring various operational conditions of the cooling system and the transformer (e.g., top oil temperature and phase current) and the intelligent controller provides warning and alarm condition indications in response to operator programmable set-points for the monitored conditions. The micro-controller also alerts the operator of sensor degradation and failures. Onboard memory is provided for storing operating history, cooling system performance, a historical plot of transformer operating temperatures, and all auxiliary cooling system events and alarm conditions. Digital communications circuitry is included for using conventional landline or wireless links to provide a remote configuration capability, and to permit remote measuring and tracking of cooling system performance and sensor readings as well as providing alarm condition notifications. Additionally, the auxiliary cooling system is equipped with an independent temperature-sensitive switch that will initiate fail safe operation of the auxiliary cooling system by bypassing the automatic features of the system in the event the transformer oil temperature exceeds a factory-set temperature.

Automated control of the cooling processes using a programmable "intelligent" controller ensures that a power transformer may be operated during peak load conditions with a high degree of confidence and assurance. The programmability of the controller permits tailoring the cooling process to specific or unique transformer cooling application requirements. A further beneficial aspect of the intelligent controller is that it permits the cooling system to be easily integrated with existing electrical power substation control systems and other data acquisition systems. In addition, the intelligent controller of the present invention enables real-time remote monitoring of performance data and system operational status and provides immediate dispatch of warning and alarm notifications of predetermined system conditions. A still further beneficial aspect of the present invention is that the cooling system may be programmed to automatically perform periodic cycling of fan and pump mechanisms during periods of extended idleness to prevent the motors/pump from seizing. These and other features disclosed herein enhance the overall utility and versatility of the cooling system and enable it to be easily integrated into existing electrical power substation control systems.

DETAILED DESCRIPTION OF THE INVENTION

Figure 1:
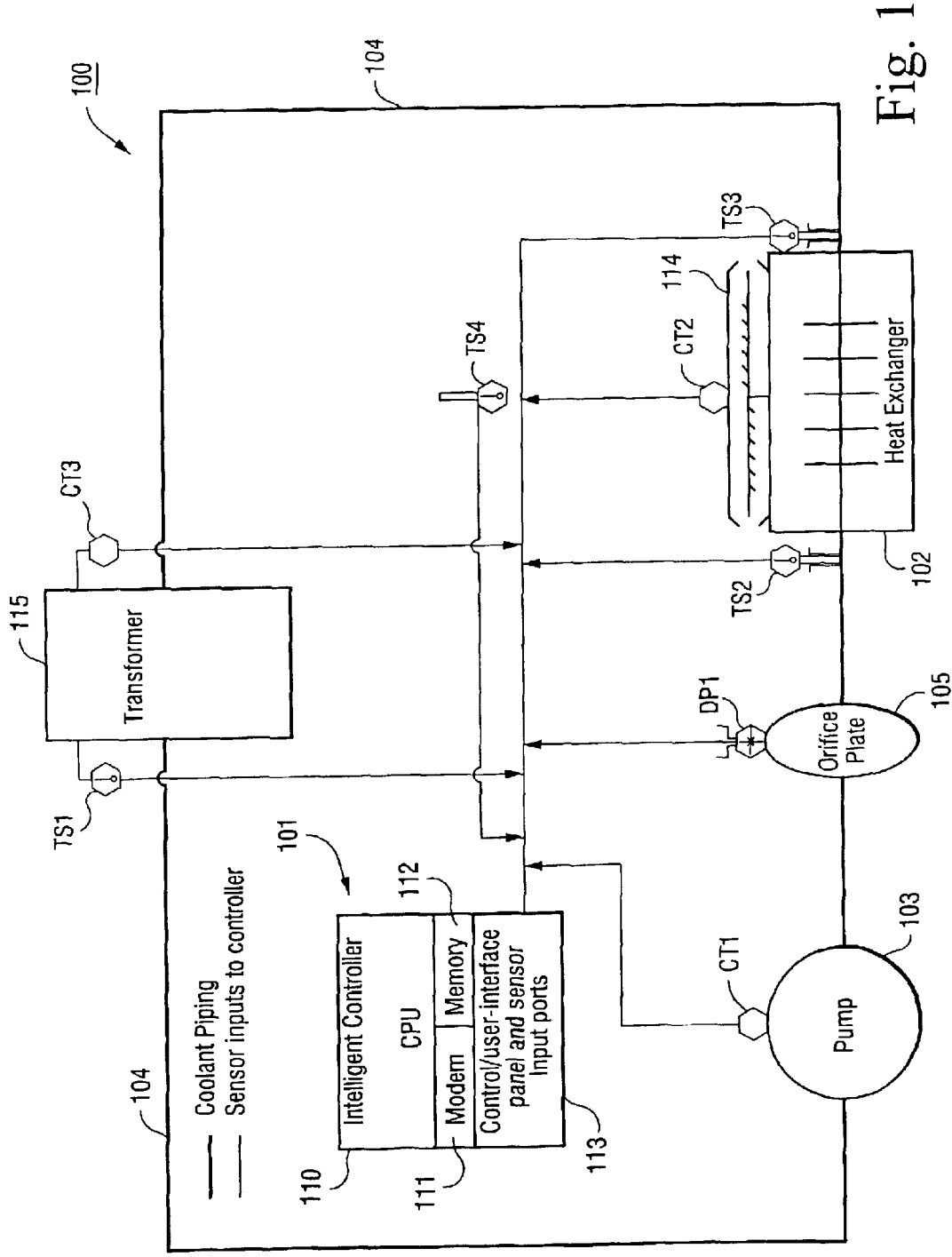
FIG. 1 is schematic diagram of the auxiliary cooling system.

The cooling system of the present invention may be used as an auxiliary or "add-on" cooling system in conjunction with existing transformer cooling systems. A general schematic diagram illustrating an example arrangement of the cooling system and controller arrangement of the present invention for providing intelligent cooling for an electrical power transformer is shown in FIG. 1. Basically, the cooling system (100) of the present invention comprises an "intelligent" controller 101, a compact heat exchanger unit 102 and a transformer coolant (typically oil) pump 103 that are packaged together in a portable compact configuration so as to function as a stand-alone heat removal system. In a conventional manner, the pump 103, pumps coolant out of the power transformer 115 via piping 104, through an orifice plate 105, through heat exchanger 102 and back to the power transformer 115. The orifice plate 105 is used to determine coolant flow in the closed system.

The "intelligent" controller 101 comprises at least a computer or micro-controller (CPU 110), a modem and/or conventional digital communications circuitry 111, data storage memory 112 and a control/user-interface 113. Transformer oil pump 103 is provided with a current sensor (CT1), orifice plate 105 is provided with a differential pressure sensor (DP1), heat exchanger 102 is provided with fan 114 and a fan current sensor (CT2). A transformer phase current sensor (CT3) and a transformer coolant temperature sensor (TS1) are provided for the transformer being cooled (115) and at least two other temperature sensors (TS2 and TS3) are used to measure inlet and outlet coolant temperatures of heat exchanger 102. An ambient air temperature sensor (TS4) is also provided. Signals from all of the sensors are provided to CPU input ports 113 of controller 101.

In an exemplary embodiment, auxiliary cooling system 100 operates in either one of two primary modes of operation: "Manual" mode and "Automatic" mode. (These "modes" of operation refer only to the manner in which the pump and fan operations are initiated—since all of the "intelligent" computation, indication and alarm features are always operational and available.) In either mode of operation, alarm and system performance data may be displayed both locally and remotely. To accommodate the operating requirements of a particular transformer 115 with which cooling system 100 is used to cool, an operator may program system control, warning and alarm condition setpoints either locally via user interface 113 or from a remote location using a configuration utility or other conventional communications software for communicating with controller 101 over a digital communications link via onboard modem 111. Onboard communications circuitry 111 is provided for connecting to and utilizing telephone lines and/or other available digital communications medium (such as, for example, other landline links, WI-FI wireless, RS-232, RS-485 or Ethernet lines). Sensor readings, alarm indications and performance data may also be provided to a remote recipient. Historical event, alarm and warning condition data are stored in controller onboard memory 112 and may be used by CPU 110 for conducting system performance analysis. Controller 101 may also be connected into a SCADA monitoring system via, for example, RS-485, Ethernet, or electrical relay connection (not shown) for triggering an alarm mechanism arranged to selectably indicate different types of cooling system faults such as: pump failed, fan failed, low flow, no flow, loss of power, flow sensor failed, or a particular thermal performance alarm condition.

Auxiliary cooling system 100 may also be remotely controlled using known communications protocols (e.g., Modbus or command line protocols) via modem, RS-232, rs-485, Ethernet, or cellular communication path to enable remote starting, stopping, programming, and monitoring. Differing levels of access protection for remote programming/control may be easily implemented using, for example, a conventional password based authorization scheme.

Figure 2:
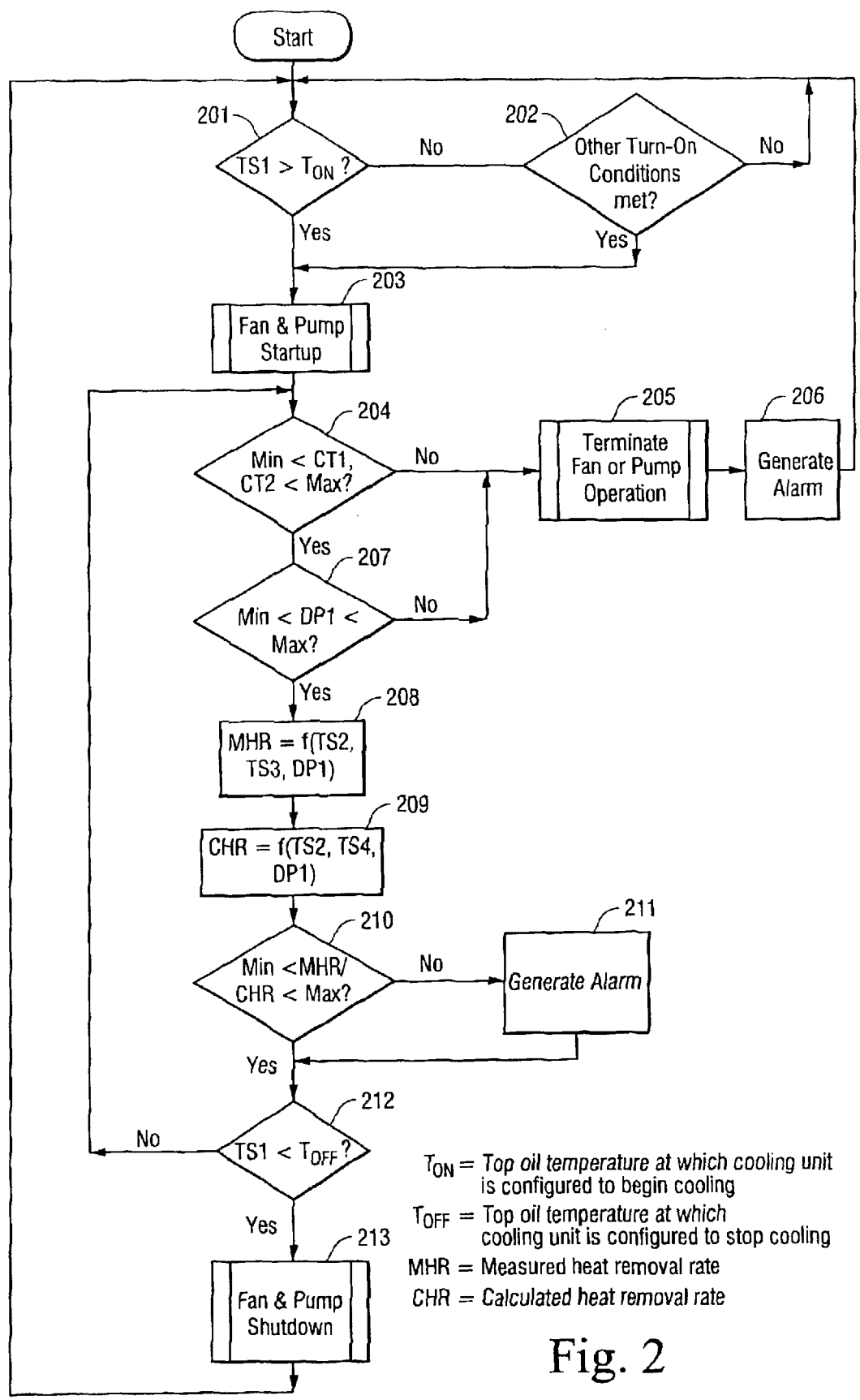
FIG. 2 is a flow diagram of an example control program executed by the intelligent controller of the cooling system.

A program flow diagram for an example intelligent control software process executed by the intelligent controller of the cooling system (when the system is in "Automatic" mode) is shown in FIG. 2. Using control panel/user interface 113, an operator inputs values for the transformer coolant (top oil) temperature, $T_{on}$, at which the cooling unit is to begin cooling, and a top oil temperature, $T_{off}$, at which the cooling unit returns to standby. Other operational control conditions, set-points and parameter values such as, for example, a minimum operating current for pump 103 or a value for a maximum current for fan 114, may be programmed and input by the operator via the control panel/user interface front as well.

As indicated at 201 of FIG. 2, controller 101 continually monitors the transformer coolant temperature from sensor TS1 to determine whether it is greater than the operator selected set-point condition temperature, $T_{on}$, for initiating cooling. At the same time, controller 101 (FIG. 1) also continually monitors the transformer temperature and transformer phase current sensors (TS1 and CT3) and determines whether certain preprogrammed "anticipatory conditions" are satisfied (e.g., specific predetermined combinations of ambient temperature, transformer load, time of day, etc.). If the transformer coolant fluid temperature measured by TS1 is greater than $T_{on}$, or one or more other preprogrammed anticipatory conditions exist (block 202), the pump and heat exchanger fan are started, as indicated at block 203.

Next, as indicated at 204, controller 110 checks a pump current reading from current sensor CT1 against a predetermined operator-programmed set-point for a minimum current value and a fan current reading from current sensor CT2 is also checked against a predetermined operator-programmed set-point for a maximum current value. If the sensed fan and/or pump currents are beyond the preprogrammed minimum and maximum values, the fan and/or pump operation is terminated (block 205) and a fault alarm condition indication is generated (block 206). Otherwise, controller 110 next proceeds to check the coolant flow rate measured by coolant flow rate sensor DP1. If after expiration of a preprogrammed delay period (for example, 30 sec), the coolant flow rate as measured by DP1 is not within a range between preprogrammed minimum and maximum values (block 207), then the cooling operations are terminated (block 205) and a fault alarm condition indication is generated (block 206). If, after expiration of the delay period, the coolant flow rate as measured by DP1 is within the predetermined range, then controller 110 computes a value for a Measured Heat Removal rate (MHR). The value of MHR is computed using conventional techniques from heat exchanger coolant inlet and outlet temperature data obtained from sensors TS2 and TS3 and the coolant flow rate obtained from sensor DP1.

After computing a value for MHR, controller 110 determines the heat removal rate of the heat exchanger for the existing ambient conditions by computing a Calculated Heat Removal rate (CHR). The value for CHR is computed by conventional techniques using data obtained from heat exchanger temperature sensor TS2, ambient air temperature sensor TS4 and the coolant flow rate from sensor DP1, as indicated at block 209. As indicated at block 210, the controller next determines whether the value of the ratio of MHR to CHR lies within a predetermined/preprogrammed "acceptable" range (for example, between 0.8 and 1.2). If the ratio is not within the preprogrammed range of acceptable values, a alarm condition indication is generated (block 211).

If the computed ratio is within the preprogrammed range, then as indicated at block 212, the transformer coolant (top oil) temperature sensor reading from TS1 is compared against the operator selected set-point condition temperature, $T_{off}$. If the reading from TS1 is greater than $T_{off}$, then cooling operation continues and the sensor monitoring and heat removal computation functions (blocks 204 to 211) are performed continually until the reading from TS1 falls below the preset $T_{off}$ value. If the reading from TS1 is lower than $T_{off}$, and the system is not being controlled by an anticipatory condition (202), then the cooling is stopped and the fan and pump operations are shut down, as indicated at block 213. Controller 110 then continues to monitor the transformer coolant temperature from TS1 and compares it against the preset $T_{on}$ value to determine if cooling operations should be reinitiated, as indicated back at block 201.

Although not explicitly illustrated in FIG. 2, routines for controlling onboard digital communications circuitry (or modem) 111 for sending sensor readings, alarm indications and performance data to a remote station may also be integrated into the control software processes of FIG. 2. For example, blocks 204 through 211 include an additional step or steps for sending sensor data, alarm indications/warnings, computed system performance data and other information to a remote facility/recipient via onboard communications device 111. Similarly, routines may be included for programming the intelligent controller to receive data and commands from a remote facility for setting cooling system operating parameter data, selecting operating mode and set-point values for triggering various cooling system operations. Historical operating and performance data for the cooling system and the transformer may also be stored in the controller memory. Such data my be used, for example, to: i) compare an actual cooling performance of the cooling system versus an expected performance over time; ii) assess the effectiveness of the cooling system; iii) record times, duration and temperature profile of the transformer whenever it is detected as operating at predetermined elevated temperatures; and iv) determine when specific monitored events occurred. In addition, although not explicitly illustrated in FIG. 2, controller 101 of auxiliary cooling system 100 may also be programmed with a routine for initiating periodic operation of heat exchanger fan 114 and/or coolant pump 103 during extended idle periods to prevent seizing of moving machinery components. A programmer of ordinary skill will appreciate that software routines for performing such tasks may be easily implemented without undue experimentation using conventional programming techniques.

Figure 3:
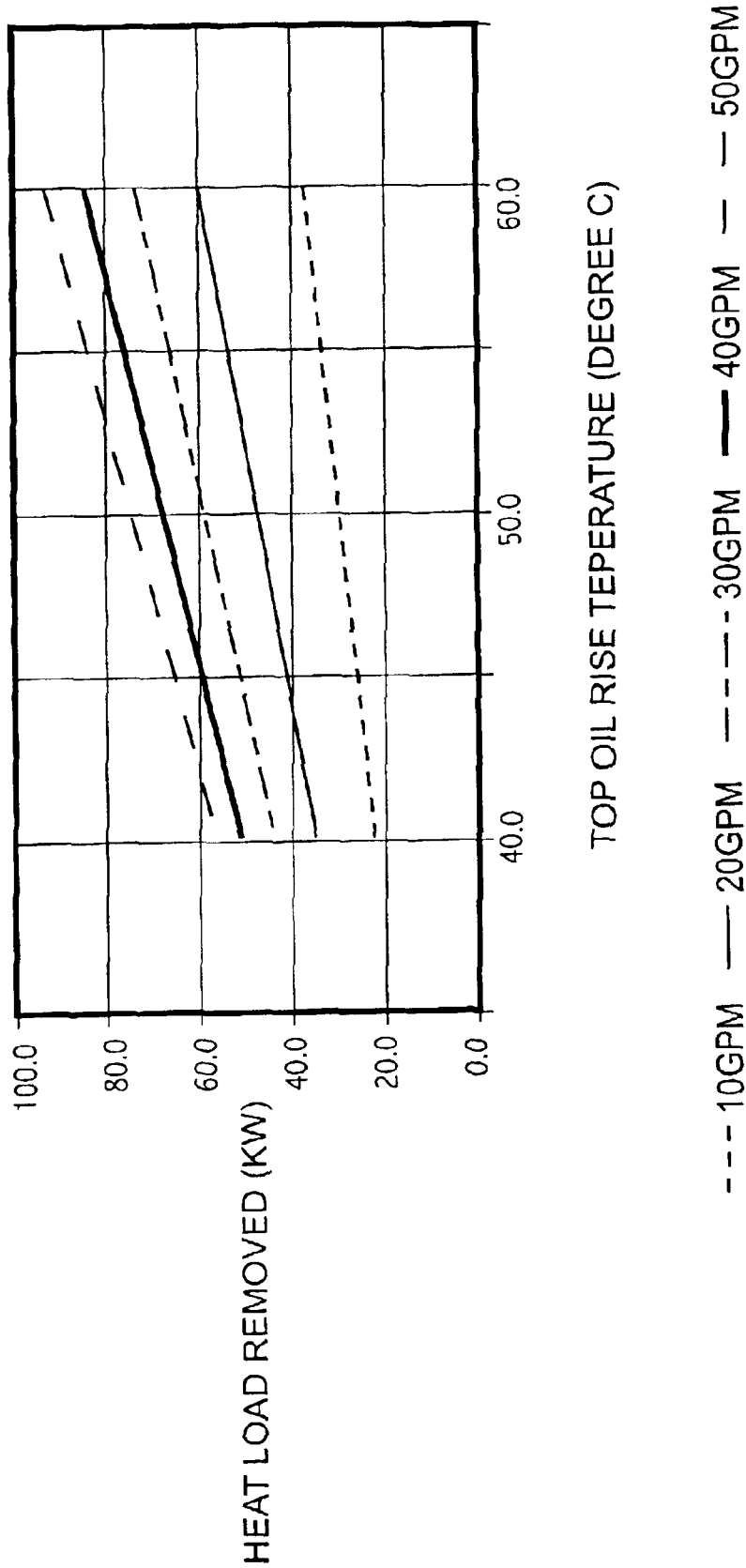
FIG. 3 is a graph illustrating example heat load removal capacity of the transformer cooling system of the present invention.

A graph illustrating the potential heat load removal capacity for an example transformer cooling system as presented above is presented in FIG. 3. Heat load removal rates are illustrated for five different coolant pumping rates of 10 GPM, 20 GPM, 30 GPM, 40 GPM and 50 GPM.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a cooling system for an electrical power transformer, said cooling system having at least a coolant pump, a heat exchanger unit, a plurality of current and temperature sensors for monitoring operation of cooling system, the transformer and ambient air temperature, and a programmable computer controller comprising at least a CPU and a data storage memory, a method of automated control of cooling system operation, comprising the steps performed by the computer controller of:
   a) obtaining data from the plurality of sensors;
   b) computing a Measured Heat Removal rate (MHR) value for the cooling system based upon data obtained from at least one temperature sensor monitoring coolant temperature;
   c) computing a Calculated Heat Removal rate (CHR) value for the transformer based at least upon data obtained from sensors monitoring coolant temperature and ambient air temperature;
   d) computing a ratio value for MHR/CHR; and
   e) generating an alarm condition indication when the ratio value computed in (d) it is not within a predetermined range of values.

2. The method of claim 1 wherein steps (a) through (e) are repeated continuously.

3. The method of claim 1 wherein the programmable computer controller of the cooling system includes a modem or other device for implementing digital communications and further includes the step of automatically providing an alarm condition indication to a remote receiving station in response to generating an alarm condition indication.

4. In a cooling system for an electrical power transformer, said cooling system having a fluid coolant and a coolant pump, a heat exchanger unit, a heat exchanger fan, a plurality of sensors for monitoring operating conditions of the transformer and cooling system components, and an intelligent controller comprising a programmable computer, a method of implementing an automated control of cooling system operation, comprising the steps performed by the controller of:
   continually monitoring the plurality of sensors, said sensors providing at least temperature or electrical current consumption data to the computer controller;
   controlling a start-up of cooling system operation in response to a monitored sensor that provides data indicative of power transformer temperature, wherein a cooling operation is initiated whenever said data indicative of power transformer temperature is greater than a first predetermined temperature value stored in said programmable computer;
   controlling a shut-down of cooling system operation in response to a monitored sensor providing data indicative of the power transformer temperature, wherein a cooling operation is terminated whenever said data indicative of the power transformer temperature is less than a second predetermined temperature value stored in said programmable computer; and, wherein the controller computer further performs the steps of:
   a) obtaining data from the plurality of sensors;
   b) computing a Measured Heat Removal rate (MHR) value for the cooling system based upon data obtained from one or more the sensors;
   c) computing a Calculated Heat Removal rate (CHR) value for the transformer based at least upon data obtained from sensors monitoring coolant temperature and ambient air temperature;
   d) computing a ratio value for MHR/CHR; and
   e) generating an alarm condition indication when the ratio value computed in (d) it is not within a predetermined range of values.

5. The method of claim 4 wherein controlling the startup of cooling system operation comprises at least initiating a coolant pump operation.

6. The method of claim 4 wherein controlling the startup of cooling system operation comprises at least initiating a heat exchanger fan operation.

7. The method of claim 4 wherein controlling the shutdown of cooling system operation comprises at least terminating a coolant pump operation.

8. The method of claim 4 wherein controlling the shutdown of cooling system operation comprises at least terminating a heat exchanger fan operation.

9. The method of claim 4 wherein the controller computer further performs the step of periodically initiating operation of the heat exchanger fan and/or coolant pump during extended cooling system idle periods.

10. An intelligent controller for a cooling system for cooling an electrical power transformer, said cooling system having at least a coolant pump, a heat exchanger unit, and a plurality of current and temperature sensors for monitoring operation of the cooling system and transformer, said controller comprising:
a computer system including memory for program and data storage and a modem for providing digital communications capabilities with remote facilities, wherein said computer is programmed to:
continually monitor the sensors and automatically control start-up and shut-down operations of the cooling system in response to sensor data indicative of one or more predetermined conditions; and, wherein the computer is further programmed to compute a value indicative of an actual heat removal rate provided by the cooling system during operation.

11. The cooling system controller of claim 10 wherein predetermined conditions for determining start-up and shut-down operations are received from a remote facility via the modem and stored in the computer system memory.

12. The cooling system controller of claim 10 wherein a start-up operation comprises at least initiating coolant pump operation.

13. The cooling system controller of claim 10 wherein a shut-down operation comprises at least terminating coolant pump operation.

14. The cooling system controller of claim 10 wherein the computer is further programmed to initiate a periodic operation of at least said coolant pump during extended cooling system idle periods.

15. The cooling system controller of claim 10 wherein the computer is further programmed to initiate a periodic operation of a heat exchanger fan during extended cooling system idle periods.

16. The cooling system controller of claim 10 wherein a sensor for monitoring coolant temperature within the transformer continually provides the computer with coolant temperature data and wherein the computer is further programmed to automatically start cooling system operation whenever coolant temperature within the transformer increases to a predetermined setpoint value, said predetermined setpoint value being stored in said computer memory.

17. The cooling system controller of claim 10 wherein the computer is further programmed to automatically start cooling system operation whenever specific predetermined anticipatory conditions exit, said predetermined anticipatory conditions being stored in said computer memory and comprising a particular set of current and/or temperature data values detected by said sensors.

18. The cooling system controller of claim 17 wherein said predetermined anticipatory conditions comprise a predetermined ambient temperature value and a detected increase in transformer phase current of a predetermined percentage amount occurring during a predetermined period of time, said predetermined ambient temperature value and predetermined percentage amount of transformer phase current increase and said predetermined period of time being stored in said computer memory.

19. The cooling system controller of claim 17 wherein said anticipatory conditions comprise a predetermined time-of-day.

20. The cooling system controller of claim 10 wherein the computer is further programmed to compute a predicted heat removal rate and to provide a remote facility with an indication of a system performance alarm condition generated whenever a computed actual heat removal rate is outside of a preprogrammed tolerance range for said computed predicted heat removal rate.

21. The cooling system controller of claim 10 wherein the computer is further programmed to provide both a local indication and an indication to a remote facility of said computed actual heat removal rate.

22. The cooling system controller of claim 10 wherein the computer is further programmed to provide an indication to a remote facility of the transformer coolant temperature.

23. The cooling system controller of claim 10 wherein the computer is further programmed to provide a warning indication to a remote facility of a high temperature condition existing for the transformer coolant when the coolant temperature is detected to be above a predetermined temperature.

24. The cooling system controller of claim 10 wherein the computer is further programmed to provide an indication to a remote facility of a sensor failure.

25. The cooling system controller of claim 10 wherein the computer is further programmed to periodically determine a health/accuracy of one or more sensors through a comparison of a plurality of sensor data readings acquired during cooling system operation and to provide an indication to a remote facility of said health/accuracy.

26. The cooling system controller of claim 10 wherein the cooling system operates in a predetermined fail safe mode if the cooling system controller fails to operate properly and the computer is further programmed to provide an indication to a remote facility of said fail safe mode operation.

27. The cooling system controller of claim 10 wherein the cooling system operates in a predetermined fail safe mode if a transformer heat load exceeds a predetermined cooling capacity of the auxiliary cooling system to provide an indication to a remote facility of operating in said fail safe mode operation.

28. The cooling system controller of claim 10 wherein the computer is further programmed to store historical transformer performance data in the memory.

29. A method for operating a cooling system for an electrical power transformer, said cooling system having an intelligent controller for providing real-time monitoring and control of cooling system performance and transformer operating condition, said controller comprising at least a programmable computer and data storage memory, comprising the steps performed by the computer of:
computing a first value indicative of actual heat removal rate provided by the cooling system during operation;
computing a second value indicative of predicted heat removal rate for the cooling system under design conditions for an existing coolant flow rate and ambient temperature condition;
performing a real-time comparison of said first and second computed values to determine if the first value is within a predetermined tolerance range of the second value; and
providing an alarm condition indication if said first value is not within said predetermined tolerance range of the second value.

30. The intelligent controller of claim 10 wherein the cooling system is a stand alone heat removal system that is compact and housed in a portable housing.

31. The method of claim 29 wherein the cooling system is a stand alone heat removal system that is used as an auxiliary cooling system in conjunction with existing transformer cooling system.

* * * * *